United States Patent
Gudmestad

[15] 3,703,954
[45] Nov. 28, 1972

[54] CONVEYOR SYSTEM FOR WIRE LIKE ARTICLES

[72] Inventor: Ragnar Gudmestad, West Allis, Wis.

[73] Assignee: Artos Engineering Company, New Berlin, Wis.

[22] Filed: March 16, 1971

[21] Appl. No.: 124,752

[52] U.S. Cl. ................................................. 198/179
[51] Int. Cl. ............................................. B65g 17/42
[58] Field of Search ........................... 198/179–180; 118/503

[56] References Cited

UNITED STATES PATENTS

| | | | |
|---|---|---|---|
| 678,359 | 7/1901 | Davis | 198/179 X |
| 868,741 | 10/1907 | Wendt | 198/179 X |
| 1,071,925 | 9/1913 | Keith | 198/179 X |
| 2,524,844 | 10/1950 | Smith | 198/179 X |

*Primary Examiner*—Edward A. Sroka
*Attorney*—James E. Nilles

[57] ABSTRACT

An endless chain having alternate pairs of inner and outer side bars moves in an oblong path around spaced sprocket wheels. Pairs of relatively swingable clamping jaws for electrical wire leads or the like are mounted at intervals on the chain and are nested between opposite side bars and associated hinge bushings thereof. Outwardly extending gripping arms of the jaws are spring biased toward each other and are temporarily swung apart into wire receiving and wire releasing positions by actuating fingers which project inward of the oblong path of chain travel and are engaged by cams at the sprocket wheels.

8 Claims, 8 Drawing Figures

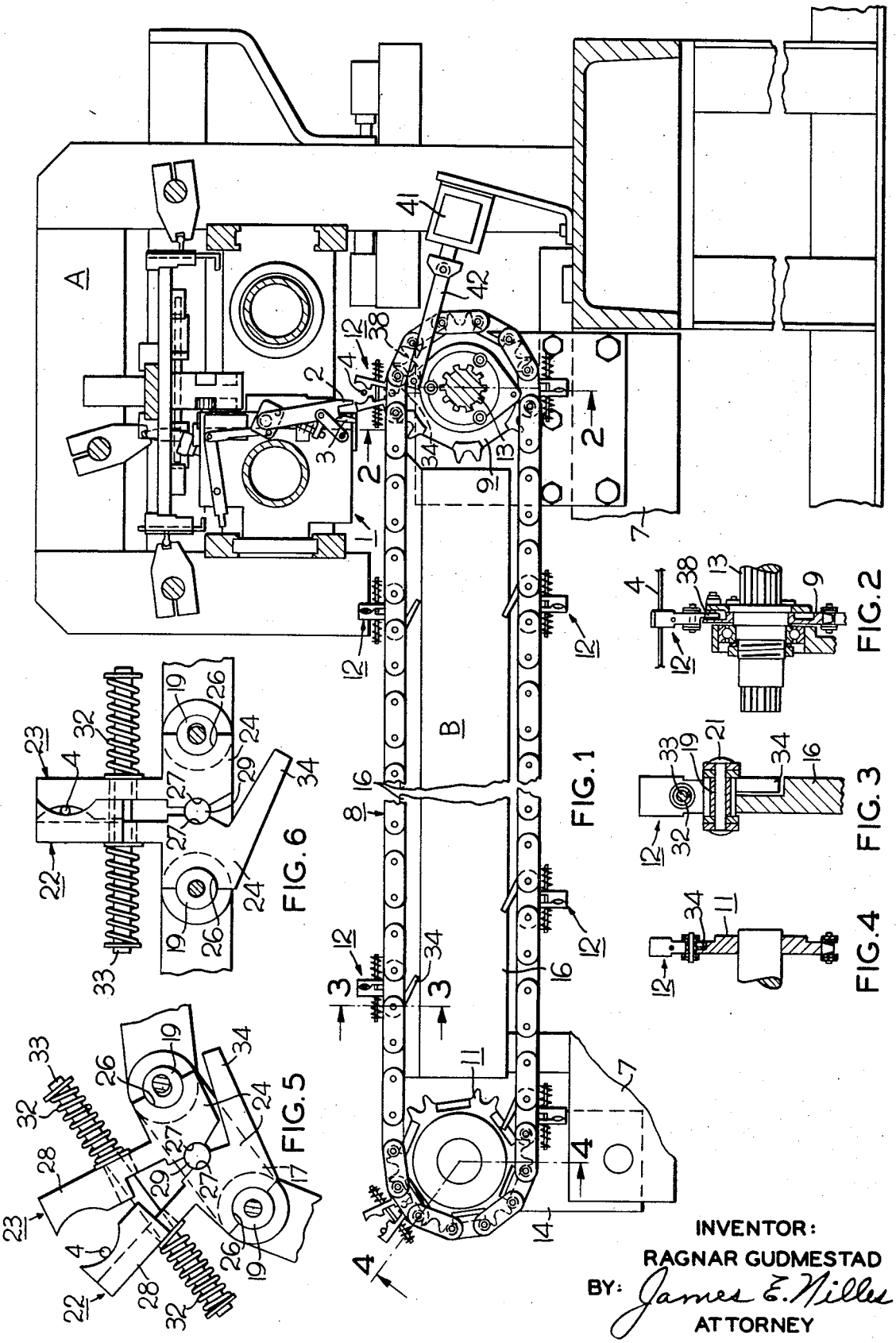

INVENTOR:
RAGNAR GUDMESTAD
BY: James E. Nilles
ATTORNEY

CONVEYOR SYSTEM FOR WIRE LIKE ARTICLES

The invention relates to a conveyor system for wire like articles, such as electrical wire leads which have been cut to length and which require further processing such as the stripping of insulation therefrom and the attachment of connecting terminals thereto at one or both ends.

Conveyor systems of that general type have heretofore been developed, particularly for use in connection with apparatus for producing electrical wire leads as shown for instance in U.S. Pat. No. 3,029,494, issued Apr. 17, 1962 to K. H. Andren for "Art of Producing Electrical Conductors."

In such earlier conveyor systems, pairs of relatively swingable wire clamping jaws were mounted at intervals on an endless chain which was moved in an oblong path by means of a driving sprocket at one end and an idler sprocket at the other end of the path. However, the problem of providing gripping clamps which are relatively simple and inexpensive, the problem of connecting the clamps to a conveyor chain of standard design, and the problem of controlling opening and closing of the clamps by means of a simple and inexpensive mechanism having engineering and performancewise not heretofore been solved in an entirely satisfactory manner.

Generally, it is an object of the present invention to provide an improved conveyor system for wire like articles which avoids the shortcomings of the prior art, particularly in the matter of simplicity of construction, control of operation and manufacture at relatively low costs.

More specifically, it is an object of the invention to provide an improved conveyor system for wire like articles wherein an endless chain having successive links thereof swingably interconnected by pivot joints is provided at intervals with article gripping clamps which are nested directly between successive pivot joints so that no mounting brackets or other attachments to a standard chain are required for supporting the clamps on the chain.

Another object of the invention is to provide an improved conveyor system of the above outlined character wherein the clamps are spring biased into closed position and are temporarily cammed open for receiving a supplied wire like article at one end of the oblong path of chain travel and for discharging it at the other end.

Another object of the invention is to provide an improved conveyor system of the above outlined character wherein the supplied article may be gripped by a clamp during a moment of standstill of the conveyor chain.

A still further object of the invention is to provide an improved chain link and clamp assembly incorporating a pair of side bars connected by a pair of hinge bushings, and a pair of swingably interconnected article gripping jaws which are rockably seated, respectively, on the hinge bushings.

These and other objects and advantages are attained by the present invention various novel features of which will become apparent from the description of a preferred embodiment shown by the accompanying drawings.

Referring to the drawings:

FIG. 1 is an elevational view showing a conveyor system embodying the invention, and a portion of a wire length measuring and cutting apparatus supplying cut electrical wire leads to the conveyor system;

FIG. 2 is a section on line 2—2 of FIG. 1;

FIG. 3 is a section on line 3—3 of FIG. 1;

FIG. 4 is a section on line 4—4 of FIG. 1;

FIG. 5 is an enlarged view of an article gripping clamp in open condition;

FIG. 6 is an enlarged view of an article gripping clamp in closed condition;

Figure 7:
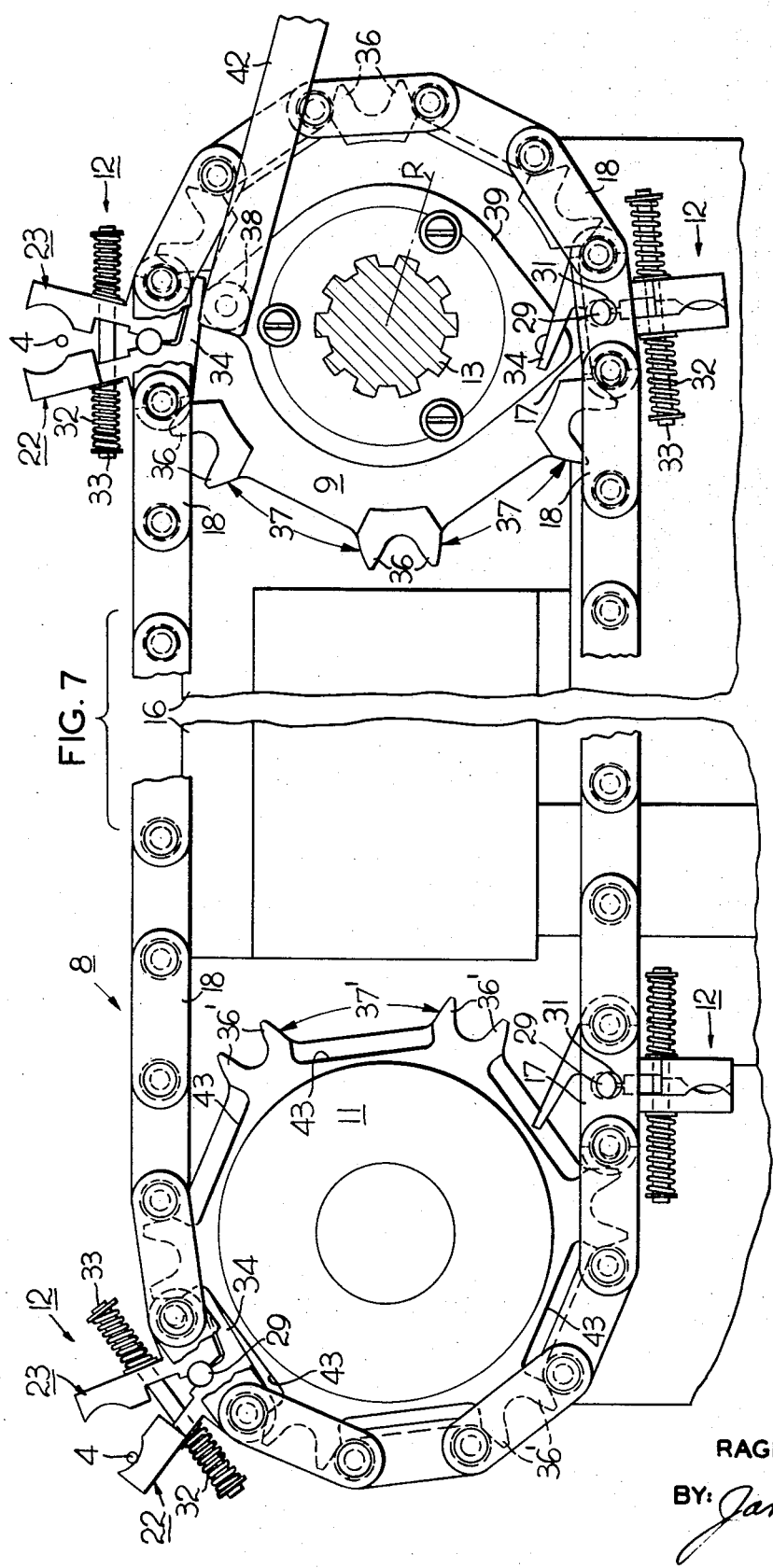
FIG. 7 is an enlarged fractional view of the conveyor system shown in FIG. 1.

My co-pending application Ser. No. 125,164 filed Mar. 17, 1971, which issued on Oct. 13, 1972, as Patent No. 3,701,301, more fully discloses the wire length measuring and cutting apparatus, part of which is shown in FIG. 1. Briefly, the apparatus generally designated by the reference character A includes a reciprocable wire feeding clamp 1 which is equipped with a pair of wire gripping jaws 2 and 3. In operation, the feeding clamp 1 moves on a feed stroke from the wire inlet end of the apparatus toward its opposite end, and then back on a return stroke to the wire inlet end. Before the clamp starts on a feed stroke its gripping jaws 2 and 3 are lowered in open condition over the end of wire which extends from a supply reel into the wire inlet end of the apparatus. The jaws 2 and 3 are then closed to grip the wire, and as the clamp starts on its feed stroke the closed jaws together with the gripped wire are raised somewhat from the input level at which the wire protrudes into the apparatus. Continued movement of the clamp 1 on its feed stroke pulls a length of wire from the supply reel and during the last part of the feed stroke the closed gripping jaws 2 and 3 together with the gripped wire are lowered to a wire discharge level in line with the input level. After the wire has been lowered to the discharge level the clamps 2 and 3 are opened to release the wire and at approximately the same moment the pulled out wire is severed from the supply reel by a cutting mechanism at the wire input end of the apparatus. During the subsequent return stroke of the feeding clamps the open jaws 2 and 3 are first raised and then move along with feeding clamp 1 back to the wire input end of the machine.

In the accompanying FIG. 1, a cut wire length which has been released by the lowered gripping jaws 2 and 3 at the end of a feed stroke of clamp 1 is designated by the reference character 4, and a conveyor system for removing the wire length 4 sidewise from the measuring and cutting apparatus is generally designated by the reference character B.

The conveyor system comprises a lateral frame extension 7 of the wire length measuring and cutting apparatus; an endless chain 8 which is looped around driving and driven sprocket wheels 9 and 11 for travel in an oblong path, and a series of article gripping clamps 12 which are mounted at equal intervals on the chain 8. The sprocket wheel 9 is mounted on a spline shaft 13 which is intermittently rotated by an associated power transmitting mechanism, not shown. The driven sprocket wheel 11 is freely rotatable on a bracket wheel 14 at the free end of the frame extension 7. A support plate 16 for the upper run of the chain 8 is secured on edge to the frame extension 7 between the sprocket wheels 9 and 11.

Figure 8:
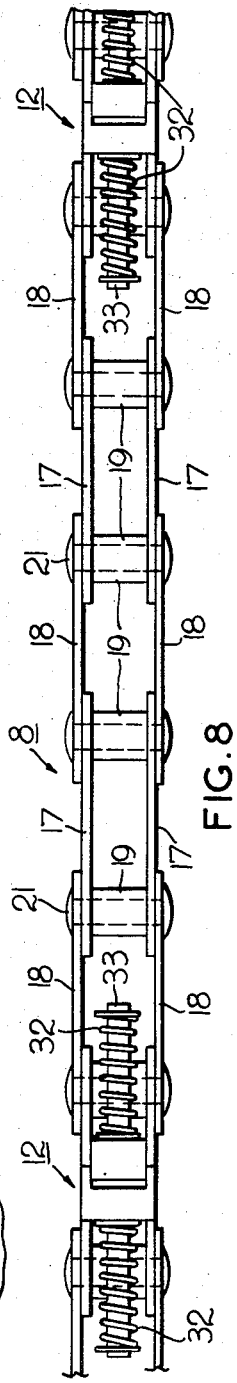
FIG. 8 is an enlarged top view of part of a conveyor chain and associated article gripping clamps.

The chain 8 is of standard design and, as best shown in FIG. 8, is made up of successive links alternately comprising pairs of inner side bars 17 and outer side bars 18. The inner side bars extend parallel in spaced lateral alignment with each other and are connected at their opposite ends by hinge bushings 19. The outer side bars 18 extend parallel in spaced lateral alignment with each other and are connected at their opposite ends by hinge pins 21 within the bushing 19.

The article gripping clamps 12 are mounted on non-successive links of the chain 8, and in the illustrated embodiment of the invention each clamp is mounted on a link having inner side bars 17 connected by hinge bushings 19. Each clamp is constructed as shown in detail in FIGS. 5 and 6, and comprises a pair of complementary jaws 22 and 23. A base portion 24 of each jaw has opposite arcuately recessed end faces 26 and 27, and a gripping arm 28 extends from the base portion 24 between the end faces 26 and 27. The arcuately recessed end faces 26 of the jaws 22 and 23, respectively, are rockably seated on the hinge bushings 19 between opposite inner side bars 17, and the jaws are swingably interconnected in the space between the hinge bushings by a motion transmitting floating pin 29 which is embraced by the arcuately recessed end faces 27 of the jaws.

For purposes of assembly and disassembly the pin 29 is axially shiftable into and out of cooperative engagement with the recessed end faces 27 while the end faces 26 are seated on the bushings 19. Holes 31 (FIG. 7) in the opposite side bars 17 are located in a midposition between the hinge bushings 19, and by simultaneous rocking of the jaws on the hinge bushings to an intermediate position between their open and closed positions, the embraced pin 29 may be brought into alignment with the holes 31. It may then be pushed out through one of the holes 31 and the jaws 22 and 23 are then free for removal from the space between the bushings 19 and side bars 17.

The jaws 22, 23 are biased to a closed position by means of springs 32 and a rod 33 which extends loosely through the jaws and supports the springs in compressed condition on its opposite ends. The jaw 22 has a torque transmitting extension or actuating finger 34 which extends obliquely toward and under the base portion 24 of the jaw 23, and by means of which opening and closing of the clamp is controlled as the chain travels around the sprocket wheels 9 and 11.

Referring to FIG. 7, pairs of adjacent teeth 36 of the sprocket wheel 9 alternate with gaps 37 therebetween at a circumferential pitch which is twice the linear pitch of the chain 8. Consequently, when the sprocket wheel rotates the pairs of teeth 36 will enter into chain links which comprise the outer side bars 18, and the chain links which comprise the inner side bars 17 and bushings 19 will settle in the gaps 37. As the closed clamps 12 on the lower run of the chain 8 are carried toward the sprocket wheel 9 by rotation of the spline shaft 13, their actuating fingers 34 are yieldingly retained in projected positions inside the oblong path of chain travel by the pressure of the clamp springs 32. The lateral width of the fingers 34 is reduced to about half of the lateral spacing between the side bars 17, and portions of the sprocket wheel 9 adjacent the gaps 37 are laterally recessed so that the fingers 34 may overlap the sprocket wheel body during the rotation of the latter. A cam roller 38 is mounted within the operating range of the actuating fingers 34 by means of a collar 39 surrounding the shaft 13. The collar 39 and the sprocket wheel 9 are connected for relative pivotal adjustment about the axis of the sprocket wheel 9, and the cam roller 38 is rotatably mounted on the collar 39 at a radial distance from the axis of the sprocket wheel 9 which is somewhat shorter than its pitch radius R.

A mechanism for adjustably maintaining the cam roller 38 in its operative position in which it is shown in FIGS. 1 and 7 comprises a spring biased solenoid 41 which is mounted on the wire length measuring and cutting apparatus A, and a connecting link 42 between the armature of the solenoid and the collar 39. In the de-energized condition of the solenoid, the cam roller 38 is kept stationary in its operative position by the spring bias of the solenoid, but an electrical energizing impulse causes the solenoid to contract and swing the cam roller 38 into an inoperative position.

In FIG. 1 the cut wire length 4 which has been produced by operation of the apparatus A is straddled by an open conveyor clamp 12 whose actuating finger 34 rests on the cam roller 38. In order to start the conveyor system the solenoid 41 is momentarily energized with the result that the cam roller 38 is pulled out from under the finger 34 and the clamp snaps shut with the wire 4 gripped between the jaws 22 and 23. The shaft 13 is then rotated to move the shut clamp and gripped wire upon the upper stretch of the chain 8 toward the sprocket wheel 11. Immediately after movement of the conveyor chain has been started the solenoid 41 is de-energized so that the cam roller 38 returns to its operative position in which it is shown in FIG. 7. Rotation of the shaft 13 is automatically stopped by a suitable mechanism, not shown, when the closed clamp has been advanced a distance which brings the next following clamp into wire receiving position at the top of the sprocket wheel 9. Initially, the clamp moving up around the sprocket wheel 9 is closed but as it reaches the top its actuating finger 34 engages the cam roller 38 which cams the clamp into open wire receiving position. Step by step rotation of the shaft 13 thus advances closed clamps with gripped wires toward the sprocket wheel 11.

The construction of the sprocket wheel 11 is similar to that of the sprocket wheel 9 in that the sprocket wheel 11 has circumferential teeth 36' which are separated by gaps 37'. However, instead of a stationary cam as the cam roller 38 at the driving sprocket 9, the driven sprocket has a circumferential series of cam shoulders 43 adjacent, respectively, to the gaps 37'. As the conveyor chain 8 wraps itself around the wheel 11 and the clamps 12 settle in the gaps 37', their actuating fingers 34 bear against the shoulders 43, and cause opening of the clamps as they move around the sprocket wheel. Wires which have been gripped by the clamps are thus released and may drop away into a trough or the like, not shown. In the lower peripheral region of the sprocket wheel 11, the actuating fingers 34 of the clamps recede from the cam shoulders 43. The jaws 22, 23 will therefore swing into clamp closing positions under the pressure of the springs 32 as the clamps move into the lower run of the conveyor chain 8.

I claim:

1. A conveyor system for wire like articles comprising a support mounting a driving and a driven sprocket wheel for rotation about spaced parallel axes; an endless chain looped around said sprocket wheels and having a successive links thereof swingably interconnected by pivot joints; a series of clamp assemblies mounted on and spaced from each other in the longitudinal direction of said chain each of said clamp assemblies comprising a pair of complementary article gripping jaws rockably seated, respectively, on a successive pair of said hinge joints; motion transmitting means operatively interconnecting said jaws so that they will rock together about said successive hinge joints into clamp opening positions upon torque application to one of said jaws; resilient means biasing said jaws into clamp closing positions; and control means cooperable with said one jaw of each of said clamp assemblies for intermittently applying said clamp opening torque thereto during travel of said chain around said sprocket wheels.

2. A conveyor system as set forth in claim 1, wherein said one jaw of each of said clamp assemblies has a torque transmitting finger element extending transversely of said chain, and wherein said control means comprise a cam element mounted on said support for selective adjustment into and out of an actuating position in cooperative relation to said torque transmitting finger elements of said clamp assemblies, cooperative engagement of said finger elements with said cam element in its actuating position upon movement of said chain around said sprocket wheels causing said jaw elements to swing into clamp opening position, and adjustment of said cam element of said actuating position causing said jaw elements to swing into clamp closing position independently of movement of said chain around said sprocket wheels.

3. A conveyor system as set forth in claim 2, wherein said cam element is mounted for rotary back and forth adjustment about the axis of one of said sprocket wheels.

4. As an article of manufacture, a chain link and clamp assembly comprising a pair of parallel side bars in spaced lateral alignment with each other; a pair of parallel hinge bushings connecting one of said side bars at its opposite ends with corresponding opposite ends of the other side bar; a pair of complementary article gripping jaws rockably seated, respectively, on said hinge bushings; motion transmitting means swingably interconnecting said jaws in the space between said bushings; resilient means operatively associated with said jaws for biasing then into clamp closing positions; and a torque transmitting finger element extending from one of said jaws transversely of its seating bushing.

5. A chain link and clamp assembly as set forth in claim 4, wherein said motion transmitting means comprise a pin element embraced by opposite arcuately recessed portions, respectively, of said article gripping jaws.

6. A chain link and clamp assembly as set forth in claim 5 wherein one of said side bars has an aperture intermediate its ends for axial insertion of said pin element between and for axial withdrawal thereof from said arcuately recessed jaw portions.

7. A chain link and clamp assembly as set forth in claim 4, wherein said resilient means comprise a rod element extending loosely through said jaws generally lengthwise of the link and coil springs surrounding opposite end portions of said rod and reacting, respectively, between the latter and said jaws.

8. A chain link and clamp assembly as set forth in claim 4, wherein article gripping arms of said jaws extend outward from one side of the space between said side bars, and wherein said finger element extends outward from the opposite side of said space and is of narrower width than the lateral spacing of said side bars.

* * * * *